Patented Dec. 14, 1948

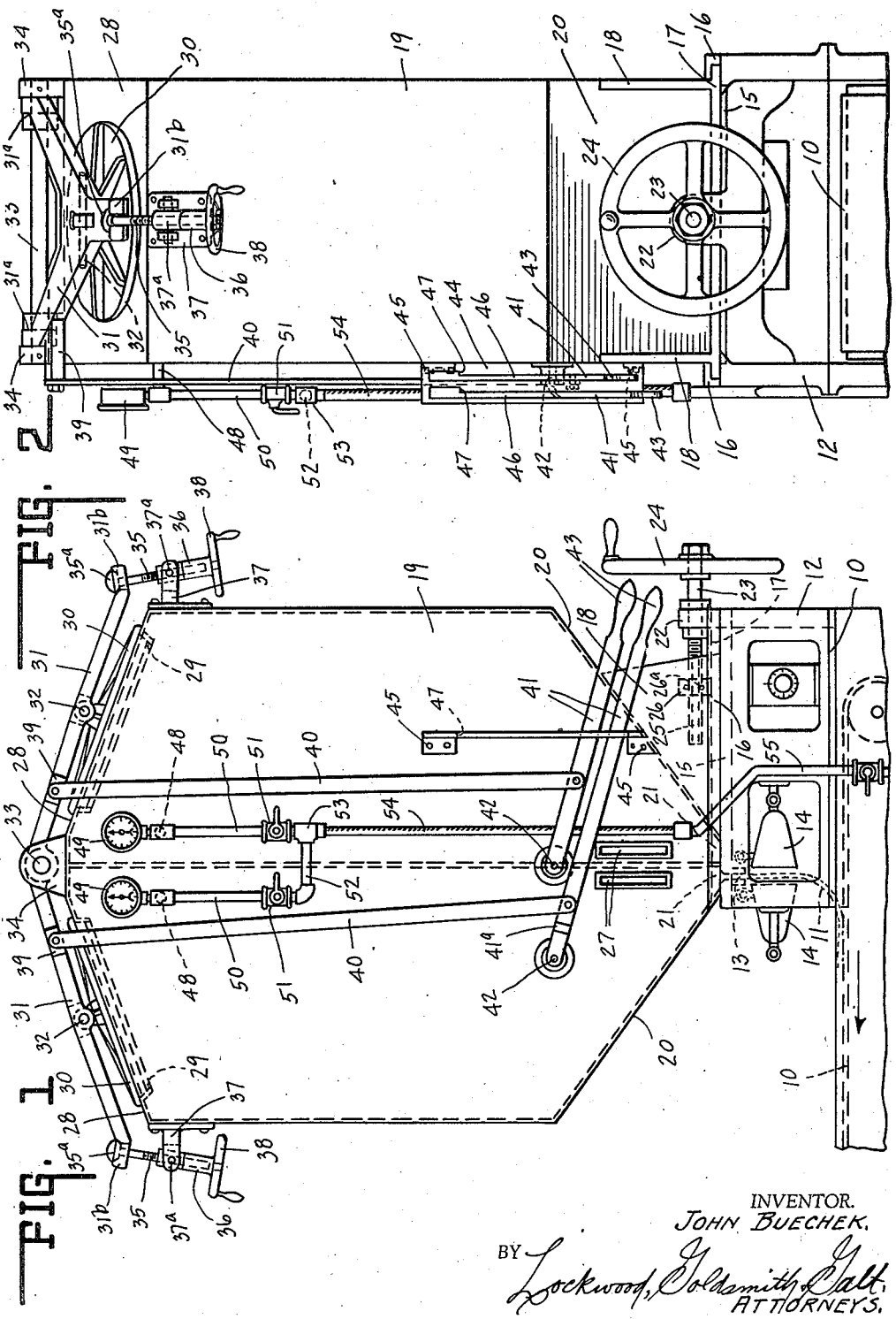

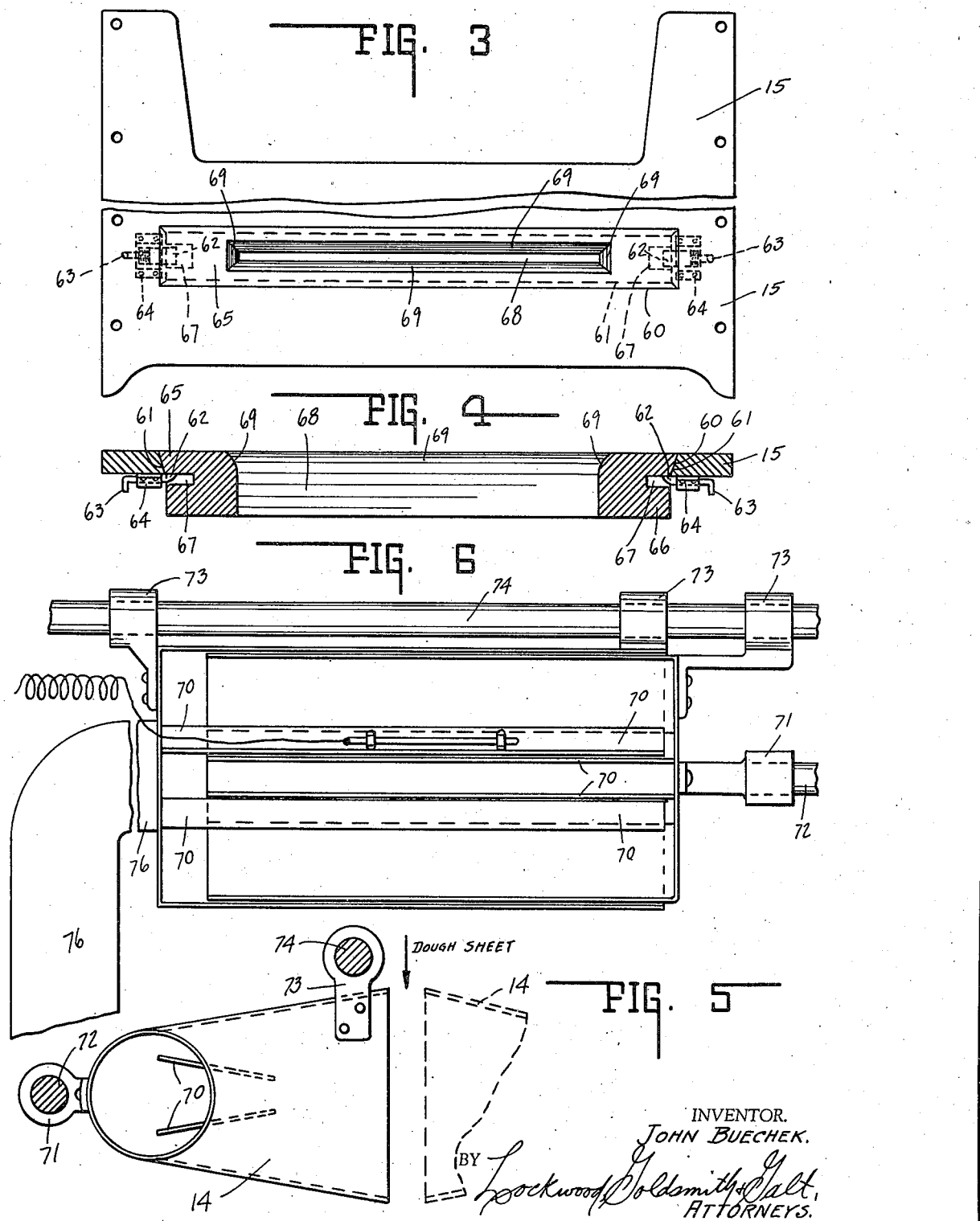

2,456,371

UNITED STATES PATENT OFFICE 2,456,371

PRESSURE SHEETING OF DOUGH

John Buechek, Kokomo, Ind., assignor, by mesne assignments, of one-half to American Bakers Machinery Company, St. Louis, Mo., a corporation Application September 16, 1943, Serial No. 502,555

3 Claims. (Cl. 107—14)

This invention relates to apparatus for continuously forming a sheet of yeast type dough of predetermined thickness and width.

The chief object of the present invention is to continuously form a yeast dough sheet, which sheet may be subsequently rolled up, folded, or otherwise manipulated by machinery or manually to produce a wide variety of bakery products.

The chief feature of the present invention resides in the pressure discharge of the yeast dough from a throat, same being at least sufficiently elongated to prevent ballooning or swelling incident to sheet pressure discharge and pressure release.

Another feature of the present invention resides in the use of air under pressure, or an inert gas, or when desired, an active gas (same possibly being desirable for certain or particular doughs).

A further feature of the present invention resides in the elongated sheet discharging throat whereby the swelling or ballooning of the yeast dough sheet incident to its pressure formation is prevented.

Other objects and features of the invention will be set forth more fully hereinafter.

By way of further explanation it may be stated that the sheeter herein disclosed may be substituted for, the beater and immediately subsequent rolls, illustrated and described in copending application Ser. No. 414,760 filed October 13, 1941, and entitled Baking dough rolling machine, allowed April 5, 1943, and issued as Patent No. 2,337,539, dated December 28, 1943.

The full nature of the invention will be understood from the accompanying drawings and the following description and claims:

In the drawing

Fig. 1 is a side elevation of a dual reservoir embodiment of the invention.

Fig. 2 is an end view thereof.

Fig. 3 is a top plan view of the main plate, die and throat.

Fig. 4 is a longitudinal sectional view thereof.

Fig. 5 is a side elevation of a single funnel structure.

Fig. 6 is a plan view thereof.

In the drawings 10 indicates an endless belt to which the sheeter device discharges the dough sheet and 11 the sheeter frame base straddling the intake end and upper run thereof. Thereabove is the housing 12 which mounts the elongated throat 13 below which in opposed relation are the discharge ends of the air funnels 14.

The dough sheet discharging from the elongated throat has heated air discharged thereto which forms a surface on said sheet, both front and back or top and bottom, having reference to the belt 10, so that such dough sheet is in condition for handling. In this instance the heated air does not serve as a lubricant for the sheet but as a skin former on the tacky dough sheet.

Rigid with the throat 13 and from which it depends is the top plate 15. At opposite sides thereof and preferably parallel to belt 10 are the ways 16 in which is mounted cross-head type plate 17 having at each side the upwardly extending plates 18 for the support of the dual reservoirs 19.

These two reservoirs are fabricated as a unit and have inclined bottoms 20 directed towards each other. Each reservoir terminates in an outlet 21 to which reference will be had later. A bracket 22 on housing 12 rotatably supports shaft 23 terminating in hand wheel 24 at one end and providing a thread portion 25 threaded in the split nut 26 rigid with plate 17. As the hand wheel is rotated, the plate 17 and the reservoirs can be moved in said ways, and when desired this power may be disconnected by opening up the split nut 26 at 26a and the reservoirs removed for cleaning the outlets thereof and repairs.

Each reservoir near its outlet may be provided with a sight glass 27 for visual inspection of the quantity of dough in the reservoirs. Usually one reservoir is loaded, the device operation initiated and then continued in operation while the other reservoir is being loaded. Near the exhaustion of first reservoir supply as ascertained at 27, the hand wheel shifts the other reservoir for its throat registration so that the sheet formation is continuous. While the second reservoir is discharging, the first one may be refilled.

Each reservoir 19 has an inclined top 28 with a supply opening 29 therein. A cover 30 of manhole, pressure sealing type is carried by arm 31 to which it is pivoted at 32. The upper end of this arm is bifurcated as at 31a and is pivotally mounted on shaft 33 carried at opposite ends by bearings 34 on the reservoirs. Arm 31 at its free end 31b is socketed and split, as shown in Fig. 2, to receive and seat enlarged head 35a on stem 35 that is threaded in sleeve 36 pivoted at 37a on bracket 37 on the reservoir. Hand wheel 38 draws down and releases head 34 to free same of arm 31. Each reservoir is similarly equipped.

By the aforesaid means the cover 30 is pressure sealed and secured upon the reservoir. Arm 31 includes lateral extension 39 to which is pivoted pitman or rod 40 the lower end of which is pivoted to a lever 41 pivoted at 42 upon the reservoir and terminating in hand grip portion 43. Said lever 41 is guided by slotted bracket 44 secured to the reservoir 19 at 45 and having the elongated slots 46 therein with offset lever retaining portions 47.

Two levers 41 are shown for the two covers and these are of dissimilar length, the longer being offset at 41a to clear the shorter one, and permit independent operation of either without interference. When pressure lock 31b—34 is released, the appropriate lever arm 41 is raised to lift the cover from opening 29 and when arm 41 is seated in offset 47 of slot 46, the cover will be maintained in elevated position to permit filling of the reservoir. Closing and sealing of the reservoir is the reverse of the aforesaid.

Each reservoir 19 has a pipe 48 entering same near its upper end. This pipe is the pressure line. It also supports gauge 49 and the depending portion 50 include regulating and cut off valve 51. Both lines 49 are connected as at 52 and the intake end 53 is connected to a flexible conduit or hose 54 in turn connected to a rigid pressure supply line 55 which may be valve controlled.

During reservoir filling valve 51 is closed. During dispensing it is opened. Usually about 15 pounds pressure is satisfactory to discharge dough from the outlet 21 and through throat 13. The yeast type of dough, if its rising action is to be temporarily inhibited, may have pressure applied to the filled reservoir even though the same at that time be not actually dispensing.

Since both portions of the reservoirs are similar but reversed, and same are sufficiently illustrated herein, no further description of the similar and duplicated parts is believed necessary.

Reference will now be had to Figs. 3 and 4. Therein is illustrated the stationary plate 15 over which slides plate 17 having openings therethrough to which outlets 21 connect. Plate 15 includes a single opening 60 which is tapered as at 61. Therebeneath are spring latches 62 having handles 63 and carried by the under face of said plate as at 64. The throat member 13 is a die having a tapered flange top 65 with a depending tubular portion 66 externally socketed at each end as at 67 to seat the latches 62 for holding the die plate to and in the master plate 15.

This die has an opening therethrough as indicated at 68, the upper end being flared as at 69 to facilitate dough entrance. Note the extreme length of the dispensing throat. This is intentional. If it were not present pressure fed dough would balloon or swell out and not have the thickness and width determined by and as of the die opening. This extreme length of throat insures enough friction on the advancing dough sheet so that by regulating the pressure feed, the dough sheet at the discharge end of the throat, despite pressure feeding of dough to the throat, is not subject to any appreciable pressure at the end of the throat, consequently does not distend and continues to flow therefrom subject only to gravity acting thereon.

Reference now will be had to Figs. 5 and 6 wherein the air blast mechanism is better illustrated. Each funnel 14 is flared as shown and includes therein baffles 70. Each is mounted at 71 on shaft 72. Arm 73 also supports the funnel by shaft 74. A thermostat 75 in the funnel controls the heat supplied by an electric heater, if desired, and not shown, which heats air supplied by conduit 76 to said funnels of which there are two and which discharge towards each other and on opposite sides of the downwardly, moving dough sheet immediately below the throat 13.

It will be apparent that when the reservoirs are of belt width, and the several plate openings of similar or greater width any one of a number of similar die throats may be employed to obtain sheets of different thicknesses and widths. Also the several throats in addition to varying in width and length may also vary in depth as found most convenient. Similarly air pressure may vary from 5 to 30 pounds as required or desired.

As previously explained, movement of the reservoirs to selectively discharge from the selected throat insures continuous sheeting. When it is desired to clean the throat, the empty reservoirs are sufficiently moved to expose the throat whereupon same can be cleaned provided there is no applied pressure.

It is further to be noted the funnels are wide enough to pass air across the opposite side edges of the dough sheet regardless of the sheet width or, as preferred, these funnels may be adjusted to miss one edge on one side and similarly the other funnel is oppositely offset if desired. Thus a tacky strip at one or both side edges (on opposite sides in this event) can be left on the sheet.

This arrangement will eliminate the water spray or edge moistening means of the copending patent referred to. As stated, this light flow of air (heated if desired and thermostatically controlled if desired) absorbs moisture from the surface of the dough sheet and creates or forms a slight crust thereon. This prevents the sheet sticking to the belt, or to itself, when folded, rolled or otherwise shaped upon itself, such shape to be retained in the baked product.

Since different doughs contain different degrees of moisture, the heating of the air is regulated as desired, to provide such crust, etc. Preferably the drying air is supplied under pressure by a fan not shown.

Relative to the funnel adjustments, as stated these may be moved to different distances apart and different distances laterally of each other as described and as required or desired.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. Pressure apparatus for continuously sheeting baking dough from a plurality of dough masses including a sealable reservoir for each mass, means securing the reservoirs together as a unit, a single elongated tubular throat, each reservoir having a hopper type bottom closure with a dough outlet selectively registrable with said throat, means for applying fluid pressure to each dough mass when the reservoir outlet thereof is registered with said throat, means slidably supporting the unit above the throat and sealing the outlet not registered therewith, and means reciprocating the unit on the support means for selectively and alternately registering said outlets, one at a time, with said throat.

2. Apparatus as defined by claim 1 wherein means is provided for regulating the pressure application by the pressure applying means, the latter being singular to each reservoir and said regulating means is individual to each reservoir, and adapted to apply pressure to each reservoir regardless of throat registration.

3. In combination a plurality of aligned reservoirs, each having a bottom closure with a dough discharge orifice, a main frame, a plate carried thereby with a throat having an inlet at one end and a depending outlet, and means slidably supporting the reservoirs upon the frame and with the orifices coplanar with the plate for selective registration of an orifice with the throat inlet and closing of the non-registering orifices.

JOHN BUECHEK.

REFERENCES CITED

The following references are of record in the file of this patent:

UNITED STATES PATENTS

| Number | Name | Date |
| --- | --- | --- |
| Re. 16,143 | Lindsey | Aug. 18, 1925 |
| 147,762 | Fuller | Feb. 24, 1874 |
| 375,168 | Langles | Dec. 20, 1887 |
| 443,862 | Mitchell | Dec. 30, 1890 |
| 472,765 | Mitchell | Apr. 12, 1892 |
| 708,180 | Von Susskind | Sept. 2, 1902 |
| 855,438 | Ebel | May 28, 1907 |
| 1,433,471 | Ojeda | Oct. 24, 1922 |
| 1,852,005 | Garbutt | Apr. 5, 1932 |